United States Patent
Nian

(10) Patent No.: US 8,509,217 B2
(45) Date of Patent: Aug. 13, 2013

(54) METHOD AND DEVICE FOR ESTABLISHING A ROUTE OF A CONNECTION

(75) Inventor: Qingfei Nian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 261 days.

(21) Appl. No.: 13/124,837

(22) PCT Filed: Dec. 16, 2009

(86) PCT No.: PCT/CN2009/075615
§ 371 (c)(1),
(2), (4) Date: Apr. 18, 2011

(87) PCT Pub. No.: WO2010/069246
PCT Pub. Date: Jun. 24, 2010

(65) Prior Publication Data
US 2011/0286358 A1 Nov. 24, 2011

(30) Foreign Application Priority Data
Dec. 16, 2008 (CN) .......................... 2008 1 0186417

(51) Int. Cl.
*H04L 12/28* (2006.01)
(52) U.S. Cl.
USPC .......................................... 370/351; 370/401
(58) Field of Classification Search
USPC ................. 370/237, 238, 351, 395.21, 401
See application file for complete search history.

(56) References Cited

U.S. PATENT DOCUMENTS

| | | | |
|---|---|---|---|
| 6,147,971 A * | 11/2000 | Rochberger et al. | 370/238 |
| 6,944,675 B2 * | 9/2005 | Fujita | 709/240 |
| 2002/0141378 A1 * | 10/2002 | Bays et al. | 370/351 |
| 2004/0042398 A1 * | 3/2004 | Peleg et al. | 370/230 |
| 2005/0243817 A1 * | 11/2005 | Wrenn et al. | 370/389 |
| 2009/0228575 A1 * | 9/2009 | Thubert et al. | 709/220 |

FOREIGN PATENT DOCUMENTS

| | | |
|---|---|---|
| CN | 101030814 | 9/2007 |
| CN | 101030814 A | 9/2007 |
| CN | 101227248 | 7/2008 |
| CN | 101227248 A | 7/2008 |
| CN | 101431698 | 5/2009 |
| CN | 101431698 A | 5/2009 |

OTHER PUBLICATIONS

International Search Report for International Application No. PCT/CN2009/075615, mailed Mar. 25, 2010, 4 pages (English translation).
Written Opinion for International Application No. PCT/CN2009/075615, mailed Mar. 25, 2010, 4 pages (English translation).
International Search Report for PCT/CN2009/075615, mailed on Mar. 25, 2010, 2 pages.

* cited by examiner

*Primary Examiner* — Hong Cho
(74) *Attorney, Agent, or Firm* — Oppedahl Patent Law Firm LLC

(57) ABSTRACT

The present invention provides a method for establishing a route of a connection, which comprises: a route relation group is configured on a service node responsible for route calculation; the route relation group comprises a connection in which the service node is contained and other connections having route relation with the connection; when a route of a connection is requested to be established, the service node responsible for route calculation confirms the route of the connection according to the route relation group configured on the service node, and then establishes the route of the connection. A device for establishing a route of a connection is also provided in the present invention. With the present invention, the problem of high probability of route conflict in the existing connection route establishment process can be solved.

7 Claims, 4 Drawing Sheets

METHOD AND DEVICE FOR ESTABLISHING A ROUTE OF A CONNECTION

This is a U.S. National Phase Application of International Application No. PCT/CN2009/075615 filed Dec. 16, 2009, which claims priority to Chinese Patent Application No. 200810186417.6 filed Dec. 16, 2008, the disclosures of which are incorporated herein by reference in their entirety.

TECHNICAL FIELD

The present invention relates to the field of communications, and in particular, to a method and device for establishing a route of a connection.

BACKGROUND

In an Automatically Switched Optical Network (ASON), route relation may exist between different connections of the same service, between different services, and between connections of different services. For example, a service has two connections, which are a work connection and a protection connection, then route relation is formed between the two connections, and it is also route relation that no resource can be shared between two services. The route relation needs to be managed by a management plan (namely, a network management system), or a control plan, so that a service can be effectively protected and recovered in case of failure.

As for route relation management of connections, methods, such as a manual route constraint method and a connection correlation method, are provided in the prior art. In the manual route constraint method, route resource that a route of a connection cannot pass or must pass is designated during the establishment of the route of the connection; in the connection correlation method, connections are correlated, then resource data is exchanged between services, and a route constraint is conducted during a route calculation according to the exchanged resource data.

The existing methods above are respectively disadvantaged in that: the manual route constraint method cannot provide real-time constraint correlation information when rerouting occurs in connections, thus failing to realize route relation management after the rerouting occurs in connections; the connection correlation method cannot reflect resource conditions in real time, although it obtains the relevant information for constraining the route by exchanging resource between correlated connections it actually only obtains the snapshots of the resource, therefore the connection correlation method cannot realize real route relation management of connections. Based on the route relation management mechanisms provided by the prior art, the probability of a conflict between a calculated route and other routes during the establishment of connections may be relatively high due to the above problems, but no effective method is provided in existing route establishment methods to reduce the probability of route conflict.

SUMMARY

In view of this, the present invention mainly aims to provide a method and device for establishing a route of a connection so as to solve the problem of high probability of route conflict in the existing route establishment of connections.

In order to realize the above purpose, the technical solution of the present invention is implemented as follows.

The present invention provides a method for establishing a route of a connection, which comprises:

configuring a route relation group on a service node responsible for route calculation, the route relation group comprises a connection in which the service node is contained and other connections having route relation with the connection; and when a route of a connection is requested to be established, the service node responsible for route calculation confirms the route of the connection according to the route relation group configured on the service node, and then establishes the route of the connection.

Wherein the step of configuring a route relation group on a service node responsible for route calculation may specifically comprise:

classifying connections into a corresponding route relation group according to route relation between connections;

storing a label of the route relation group in route resource information of each connection in the route relation group; and configuring information of the route relation group and route resource information of all the connections in the route relation group on the service nodes of each connection in the route relation group which are responsible for route calculation.

The step of confirming the route of the connection may specifically comprise:

after receiving a route establishment request of the connection, the service node responsible for route calculation calculates the route of the connection to obtain route resource information;

a specific route relation group which the connection belongs to is determined according to the route resource information and information of the route relation group configured on the service node;

via a route confirmation request, the calculated route resource information is sent to service nodes of other connections in the specific route relation group which are responsible for route calculation;

the service nodes of other connections responsible for route calculation respectively is confirm whether the route of the connection can be established, and return a result of the confirmation to the service node receiving the route establishment request and responsible for route calculation; and the service node receiving the route establishment request and responsible for route calculation determines whether to establish the route of the connection according to the result of the confirmation.

The step of confirming whether the route of the connection can be established may specifically comprise:

a current service node determines whether the route of the connection meets route relation of the specific route relation group, if no, the current service node determines that the route of the connection cannot be established, if yes, the current service node determines whether the route of the connection conflicts with that of a connection which has been established on the current service node;

if the current service node determines that there exists a conflict, then it determines that the route of the connection cannot be established; if the current service node determines that no conflict exists, then it determines whether a route confirmation request has been sent, if no, it determines that the route of the connection can be established, if yes, it determines whether a route of a connection corresponding to the route confirmation request sent by the current service node conflicts with that of the connection corresponding to the route confirmation request sent by the service node receiving the route establishment request and responsible for route calculation;

if the current service node determines that no conflict exists, it determines that the route of the connection can be established; if the current service node determines that there exists a conflict, then it determines whether request time of the route confirmation request sent by the current service node is earlier than that of the route confirmation request sent by the service node receiving the route establishment request of the connection and responsible for route calculation, if so, it determines that the route of the is connection cannot be established, otherwise, it determines that the route of the connection can be established.

The method may further comprise:

returning a successful route confirmation response to the service node receiving the route establishment request and responsible for route calculation if it is determined that the route of the connection can be established;

returning a failed route confirmation response to the service node receiving the route establishment request of the connection and responsible for route calculation if it is determined that the route of the connection cannot be established.

Specifically, the step that the service node receiving the route establishment request and responsible for route calculation determines whether to establish the route of the connection according to the result of the confirmation may comprise:

it is determined to establish the route of the connection if the results of the confirmation returned by the service nodes of the other connections responsible for route calculation are all successful route confirmation responses;

it is determined to give up the establishment of the route of the connection if there is a failed route confirmation request in the results of the confirmation returned by the service nodes of the other connections responsible for route calculation.

The present invention further provides a device for establishing a route of a connection, which comprises:

a route relation management module, used for configuring a route relation group on a service node responsible for route calculation, wherein the route relation group comprises a connection in which the service node is contained and other connections having route relation with the connection;

a determining module, used for confirming a route of a connection according to the route relation group configured on the service node responsible for route calculation when the route of the connection is requested to be established; and a route establishment module, used for establishing the route of the connection according to a result of the confirmation.

The device may further comprise:

a transceiver module, used for receiving a route establishment request of a connection when a route of the connection is requested to be established, and sending, via a route confirmation request, route resource information of the connection to service nodes of other connections in a specific route relation group which are responsible for route calculation; and a route calculation module, used for calculating the route of the connection according to the route establishment request of the connection to obtain route resource information and determining the specific route relation group which the connection requesting the establishment of the route belongs to.

The determining module may be further used for confirming whether the route of the connection can be established according to the route confirmation request of the connection and providing the result of the confirmation to the route establishment module.

In the method for establishing a route of a connection and the service node device provided in the present invention, first, the connections of the service having the same route relation are classified into a route relation group, then the route relation group is configured on the service nodes of each connection in the group which have capability of route calculation. When a route establishment request of a connection is initiated, after determining the route of the connection, the service node requests the service nodes of other connections in a specific route relation group which have capability of route calculation to confirm whether the route can be established, and establishes the route of the connection only if the service nodes confirm that the route can be established, thereby the connections with route relation are configured on service nodes in a manner of a route relation group, which serves as a basis for the service nodes to calculate a route, thus reducing the probability of route conflict; the confirmation by other service nodes on the route requested to be established guarantees the real establishment of the route requested to be established and the reliability of the connections, and further reduces the probability of route conflict, therefore, the consistence problem existing in route relation management of connections in existing networks is effectively solved, and the service survivability of networks is improved.

DETAILED DESCRIPTION

By setting a route relation group and configuring the route relation group on a service node of an ASON connection which have route calculation function, the present invention enables, during a route selection, the service node to send a client/network-management-system initiated route establishment request of a connection to service nodes of other ASON connections which have the same route relation and have route calculation function according to the route relation group configured on the service node, and to establish a route of the connection after all the service nodes of the other ASON connections return confirmation information indicating that the route of the connection can be established, thereby effectively managing the route relation of the connection and guaranteeing the reliability of the connection. Wherein the route relation group includes multiple connections of a service which have the same route is relation, namely, ASON connections (connections for short), and these connections may belong to the same service or different services. In embodiments of the present invention, service nodes of a connection, which have route calculation function are the source nodes of the connection; certainly, in practical application the service nodes having route calculation function may be other nodes of the connection.

The embodiments of the present invention are described in detail below in combination with the accompanying drawings.

Figure 1:
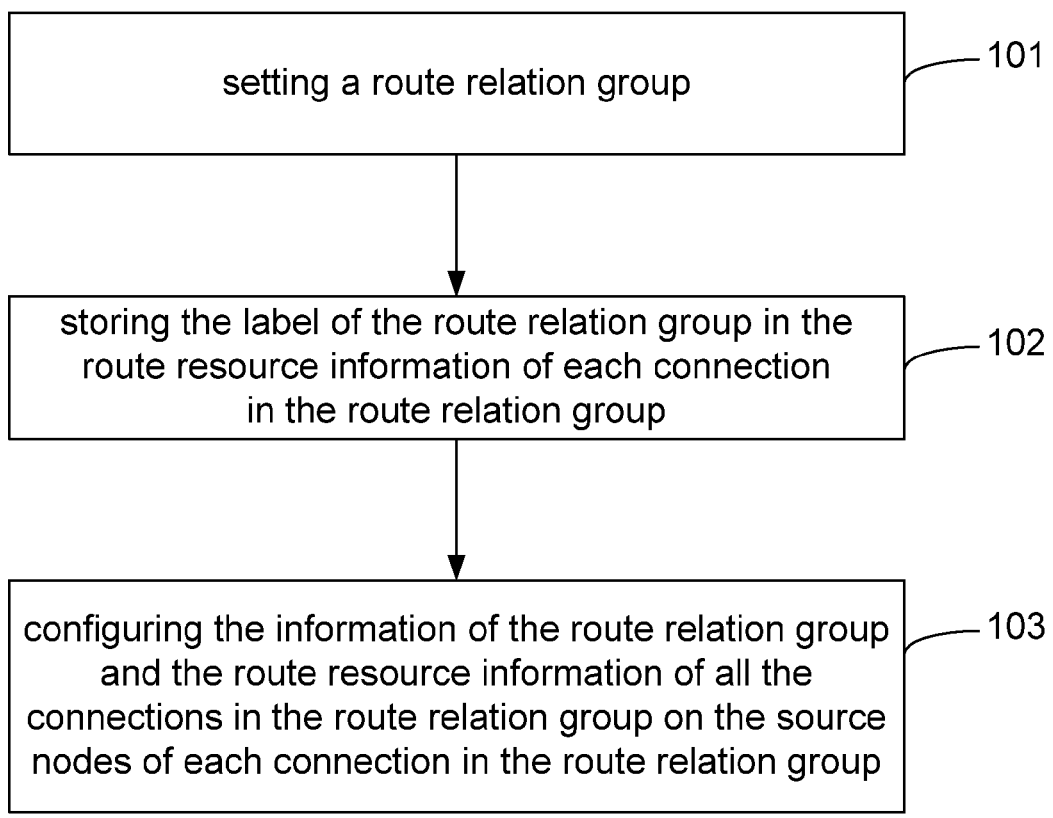
FIG. 1 is a flow chart illustrating route resource configuration on a source node of a connection according to the present invention.

In the present invention, before a route of a connection is established, route resource configuration is conducted for the source nodes of each connection of one or more services, wherein route resource includes a route relation group, route resource information of a connection and so on, as shown in FIG. 1, the configuration process comprises the following steps.

101, classifying connections of one or more services into a corresponding route relation group according to route relation between the connections.

A route relation group is set based on each connection of one or more services. A route relation group includes at least two connections having route relation, the route relation here refers to a route constraint relation between the connections of services, such as exclusion relation, that is, a route of a connection must exclude that of another connection. A unique identity, which is referred to as a label of a route relation group is allocated to each route relation group.

In this step, the classification of route relation groups is conducted according to the route relation between the connections, that is, multiple connections in each route relation group have the same route relation; for example, the route relation of all the connections in a route relation group is as follows: all the connections can share certain specific route resource. Multiple connections in a route relation group may belong to the same service or different services.

The information contained in a route relation group set in the present invention is illustrated in the following table 1:

TABLE 1

| attribute name | attribute type | Characteristic of Read/Write | Description |
| --- | --- | --- | --- |
| relationGroupId | String | Read only | Label of route relation group |
| relatedConnectionIDList | Sequence of Name | Read/Write | List of names of related connection objects |

Wherein relationGroupId is the label of a route relation group, which is unique in a network, such as a network of the same operator;

relatedConnectionIDList records the name of one connection or a group of connections having the same route relation.

In the present invention, the setting and the management of route relation are realized by a management plan, which may be a network management system or a node in a network having management function and responsible for managing the route relation between the connections of services.

102, storing the label of the route relation group in the route resource information of each connection in the route relation group.

The route resource of a connection refers to net elements and links from the entry node (e.g. end A) to the exit node (e.g. end Z) of the connection, these net elements and links constitute a route of the connection, and the information of the net elements and the links is the route resource information of the connection.

Route resource can be represented by cross connection information in a management plan, and represented by information of net elements and links in a control plan, the two representation modes can be converted to each other. In this embodiment, the label of the route relation group can be stored in the route resource information of each connection in the route relation group, for example, in a management plan, the label of the route relation group can be stored in the cross connection information of each connection; in a control plan, the label of the route relation group can be stored in the information of net elements and links of each connection.

The following table 2 illustrates the route resource information of a connection represented in the manner of cross connection information:

TABLE 2

| attribute name | attribute type | Characteristic of Read/Write | Description |
| --- | --- | --- | --- |
| active | Boolean | Read only | Active state of cross connection |
| direction | Integer | Read only | Direction of cross connection: 1: unidirectional; 2: bidirectional |
| CC Type | Integer | Read only | Type of cross connection: 1: CC; 2: SNCP |
| aEndNameList | Sequence of Name | Read only | List of ends A of cross connection |
| zEndNameList | Sequence of Name | Read only | List of ends Z of cross connection |
| relationGroupId | String | Read/Write | Label of the route relation group which a cross connection belongs to |

The information contained in table 2 is the route resource information of the connection, such as, the active state of a cross connection (active), the direction of a cross connection (direction), the type of a cross connection (ccType), the list of the ends A of a cross connection and the list of the ends Z of a cross connection, the table further contains relationGroupId, which is the label of the route relation group which the connection belongs to.

Wherein CC represents CrossConnection, that is a cross connection; SNCP represents Sub-network Connection, that is sub-network connection protection. End A and End Z respectively represent the entry node and the exit node of the connection, when the type of a cross connection is SNCP, the connection has two ends A and one end Z.

The table 1 above represents the number of the service connections (namely, connections) having route relation in a route relation group; the table 2 represents is which route relation group a cross connection belongs to. The route relation group and the attribution relation of service connections shown in the two tables are kept consistent in the configuration process of a management plan. The label of the route relation group is stored in cross connection information to mainly facilitate the subsequent route confirmation, for example, the label of the route relation group related to a service connection can be confirmed by querying the table 2, then determining can be made on the conflict of the routes of service connections according to the corresponding route relation group shown in the table 1. Of course, the label of the route relation group may not be stored in the cross connection information, in this case, it is required to find a service connection via a cross connection and then determine the route relation group which the service connection belongs to by querying the table 2 and conduct determining on route conflict. Determining on route conflict will be described in the subsequent flows.

103, configuring the information of the route relation group and the route resource information of all the connections in the route relation group on the source nodes of each connection in the route relation group.

The source nodes of the connection may be the entry nodes or the exit nodes of the connection of the service or other nodes having capability of route calculation in a control plan.

As for each route relation group, the information of the route relation group (as shown in table 1) and the route resource information of all the connections in the route relation group (as shown in table 2) need to be configured on the source nodes of all the connections in the route relation group. Specifically, the information of the route relation group and the configuration of the above route resource information can be realized by is the following defined sentence:

```
void modifyDiversityAndCorouting (
    in globaldefs::NamingAttributes_T callName,
    in callSNC::Diversity_T call Diversity,
    in callSNC::RouteGroupInfoList_T routeGroupInfoList,
    in boolean connectionRouteReArrangementAllowed,
    in string routeGroupsNumber,
    inout globaldefs::NVSList_T additionalInfo,
    out                    callSNC::CallAndTopLevelConnections_T
callAndTopLevelConnections)
    raises (globaldefs::ProcessingFailureException),
```

The description of the sentence is as follows:
this sentence can realize the function of modifying diversity and corouting (modifyDiversityAndCorouting), wherein input parameters include:

```
callName:   call name;
callDiversity:   call diversity information;
routeGroupInfoList:   list of route relation groups, which may include
the route relation groups which connections having a different source or
destination from this call belong to;
    connectionRouteReArrangementAllowed:   whether to allow
rearrangement of a route of a connection;
    routeGroupsNumber:   the number of route relation groups.
    Input/output parameters include:
    additionalInfo:   additional parameter;
    output:   Null.
    Output parameters include:
    callAndTopLevelConnections:   call and top level connection
information.
```

The involved operation exception includes:

```
EXCPT_INTERNAL_ERROR
EXCPT_NOT_IMPLEMENTED
EXCPT_UNABLE_TO_COMPLY
EXCPT_ENTITY_NOT_FOUND
EXCPT_INVALID_INPUT
EXCPT_UNSUPPORTED_ROUTING_CONSTRAINTS
EXCPT_NE_COMM_LOSS.
```

The above sentence can be distributed to the operation interface of an Element Management System (EMS) via a network management system (NMS), the EMS converts the above sentence after receiving an operating command and distributes the converted sentence to a source node of a connection needed to be configured; the source node realizes the configuration of the information of the route relation group and configuration of the route resource information of all the connections in the route relation group by executing the above sentence. Certainly, the configuration of the information of the route relation group and configuration of the route resource information of all the connections in the route relation group may also be realized by other data configuration methods in existing technologies, which are not repeated here.

The source node of a connection can process a route establishment request of a certain connection sent by another connection having route relation with the connection according to the information of the route relation group and route resource information which are configured on the source node of the connection so as to guarantee that the route relation among multiple connections contained in the route relation group can be met.

Figure 2:
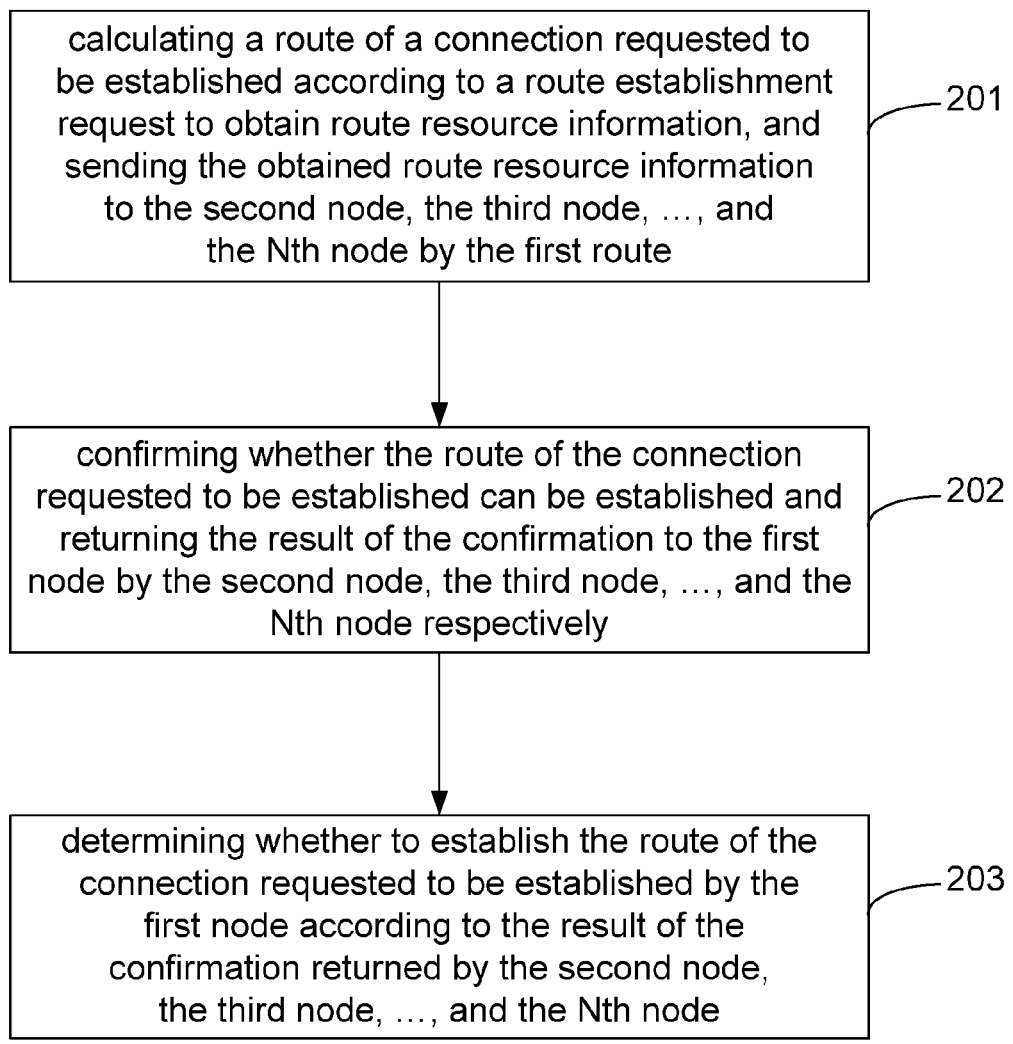
FIG. 2 is a flow chart illustrating route establishment conducted on a source node of a connection according to the present invention.

The above flow is the configuration on the service nodes of the connection, especially on source nodes; the establishment of a route of a connection is described below: if there is a service request, the source node of an established connection receives a route establishment request of a connection sent by a client or a network manger and carries out the route establishment flow of the connection shown in FIG. 2. For the sake of convenient description, in the flow shown in FIG. 2, the source node of the connection receiving the route establishment request initiated by a client or a network management system is referred to as a first node; a route relation group is determined according to the connection which the route requested to be established belongs to and the information of the route relation group configured on the first node, all the connections in the route relation group have the same route relation with the connection which the route requested to be established belongs to, and the source nodes of the other connections in the route relation group except the connection in which the first node is contained are referred to a second node, a third node, . . . , and an Nth node. As shown in FIG. 2, the establishment flow of the route of the connection comprises the following steps.

201, calculating a route of a connection requested to be established according to a route establishment request to obtain route resource information, and sending the obtained route resource information to the second node, the third node, . . . , and the Nth node by the first node.

After receiving the route establishment request of a connection which is initiated by a client or a network management system, the first node calculates the route of the connection requested to be established to obtain route resource information, wherein route constraint condition set by the client or the network management system for the route of the connection requested to be established is contained in the route establishment request; according to the set route constraint condition, a route of the connection requested to be established can be calculated, thereby route resource information can be obtained.

It should be noted that multiple route relation groups may be configured on each service node of a connection. In this step, the first node is required to determine a specific route relation group from the multiple route relation groups configured thereon, the specific route relation group has the following characteristic: all the connections therein have the same route relation with the connection requested to be established, that is, the connection requested to be established belongs to the route relation group. Specifically, the route relation group which the connection requested to be established belongs to can be determined according to the calculated route resource information.

Therefore, according to the information of the route relation group which is configured on the first node, the first node can send, via a route confirmation request, the calculated route resource information to the source nodes of the other connections in the specific route relation group, such as the second node, the third node, . . . , and the Nth node.

202, confirming whether the route of the connection requested to be established can be established and returning the result of the confirmation to the first node by the second node, the third node, . . . , and the Nth node respectively.

After receiving the route resource information of the connection requested to be established, the second node, the third node, . . . , and the Nth node respectively confirm whether the route of the connection requested to be established can be established according to the information of the route relation groups configured thereon and return the result of the confirmation to the first node. Specific implementation on confirming whether the route of the connection requested to be established can be established is illustrated via the embodiment shown in FIG. 3.

203, determining whether to establish the route of the connection requested to be established by the first node according to the result of the confirmation returned by the second node, the third node, . . . , and the Nth node.

If the second node, the third node, . . . , and the Nth node all return a result of confirmation indicating that the establishment is allowed, the first node establishes the route of the connection requested to be established, and specific implementation is based on existing technologies, which is not repeated here. The first node gives up the is establishment of the route of the connection as long as one of the second node, the third node, . . . , and the Nth node return a result of confirmation indicating that the establishment is unallowable.

Figure 3:
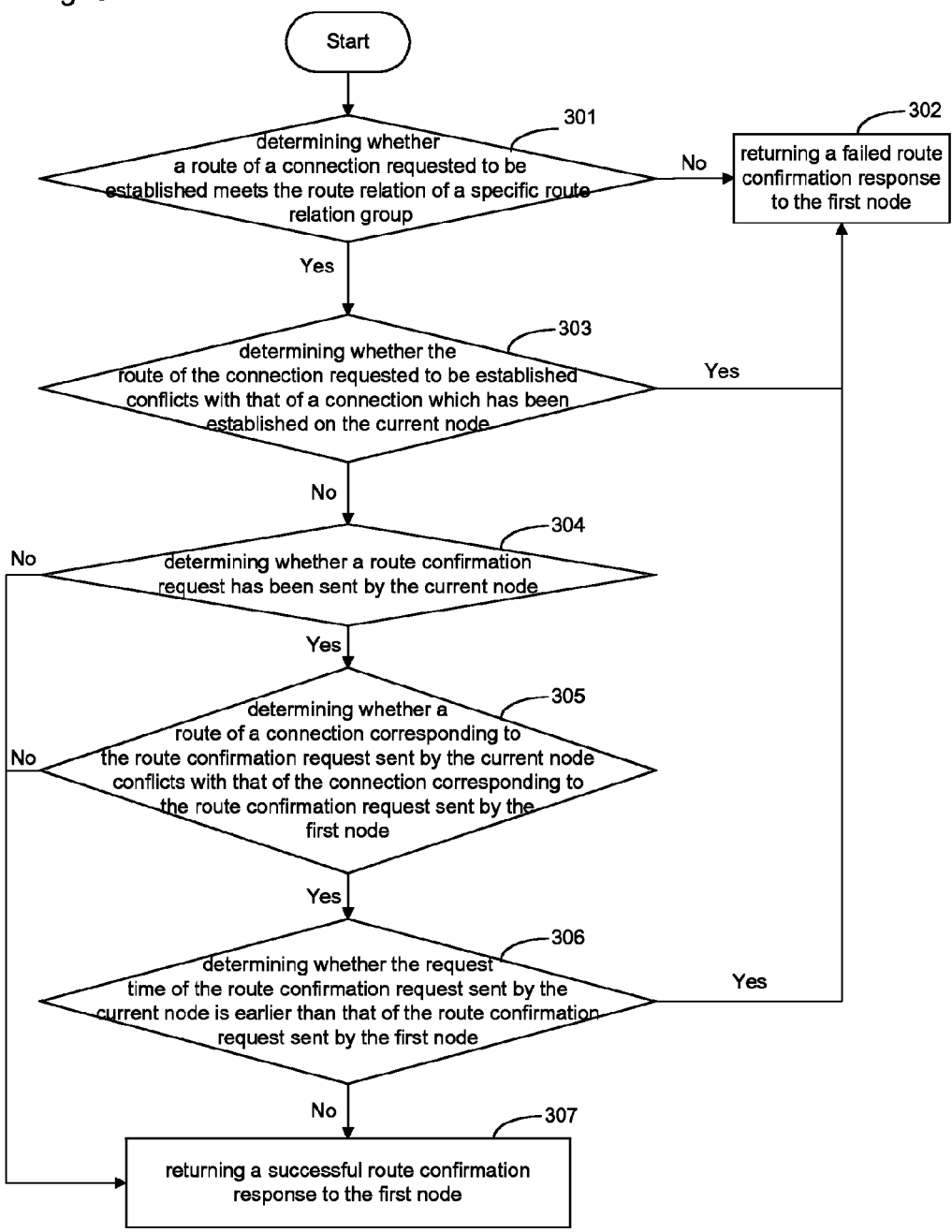
FIG. 3 is a flow chart of determining whether a route of a connection can be established according to the present invention.

FIG. 3 shows the flow of the determining by the second node, the third node, . . . , and the Nth node on whether a route of a connection requested to be established can be established, which comprises the following steps.

301-302: determining whether a route of a connection requested to be established meets the route relation of a specific route relation group, if so, Step 303 is executed, otherwise, a failed route confirmation response is returned to the first node.

After receiving a route confirmation request sent by the first node, the second node, the third node, . . . , and the Nth node determine whether the route of the connection requested to be established meets the route relation of the specific route relation group. Specifically, the determining can be made according to a route constraint condition for the route of the connection requested to be established, for example, the route relation of the specific route relation group is exclusion relation, then the current node (that is the second node, the third node or the Nth node) is required to determine whether the route of the connection requested to be established meets the exclusion relation, that is, the current node is required to confirm whether the route of the connection requested to be established cannot use or share resource of other routes, if so, the current node determines that the route relation is met and Step 303 is executed, otherwise, the current node determines that the route of the connection requested to be established cannot be established and returns a failed route confirmation response to the first node.

303, determining whether the route of the connection requested to be established conflicts with that of a connection which has been established on the current node, if so, Step 302 is executed and a failed route confirmation response is returned to the first node, otherwise, Step 304 is executed.

On the current node a route policy is preconfigured, according to the route policy the determining on whether the route of the connection requested to be established conflicts with that of the connection which has been established on the current node is conducted, is for example, the route policy on the current node specifies that routes are not allowed to share a connection, if the route of the connection requested to be established meets the route policy, then it is considered that the route of the connection requested to be established conflicts with that of the connection which has been established on the current node, specifically, the determining is made according to a specific route policy.

If there is a conflict, the current node returns a failure route confirmation response to the first node to indicate that the route cannot be established, and if there is no conflict, Step 304 will be executed.

304, determining whether a route confirmation request has been sent by the current node send, if so, Step 305 is executed, otherwise, Step 307 is executed.

In the present invention, the first node, the second node, the third node, . . . , and the Nth node are all service nodes (source nodes) on their respective connections and have route calculation function, so it is possible for each of the source nodes to receive a route establishment request initiated by a client or a network management system and send a corresponding route confirmation request.

If the current node has sent a route confirmation request, it means that it is required to establish a route of another connection different from the route requested to be established, then Step 305 will be executed, otherwise, Step 307 will be executed, the current node returns a successful route confirmation response to the first node, which means that the route requested to be established can be established.

305, determining whether a route of a connection corresponding to the route confirmation request sent by the current node conflicts with that of the connection corresponding to the route confirmation request sent by the first node, if so, Step 306 is executed, otherwise, Step 307 is executed.

Because currently there are two routes of connections needed to be established, it is required to determine whether the two routes of connections conflicts with each other. The determining on conflict here is also needed to conduct according to the route policy preconfigured on the current node, which is not repeated here.

If there is no conflict, then it means that the establishment of the two routes of connections causes no influence to each other, Step 307 will be executed, and the current node will return a successful route confirmation response to the first node, otherwise, Step 306 will be executed.

306, determining whether the request time of the route confirmation request sent by the current node is earlier than that of the route confirmation request sent by the first node, if so, Step 302 is executed, otherwise, Step 307 is executed.

In Step 201 of the flow shown in the FIG. 2, request time may be further carried in the route confirmation request sent by the first node to the second node, the third node, . . . , and the Nth node and stored in the first node. Therefore, if the route of the connection corresponding to the route confirmation request sent by the current node conflicts with that of the connection requested to be established in the present invention, it is required to compare the request time in the two route confirmation requests, if the request time of the route confirmation request sent by the current node is earlier, then the current node determines that the route corresponding to the route confirmation request sent by the first node cannot be established, Step 302 will be executed and a failed route confirmation response will be returned to the first node, otherwise Step 307 will be executed if the request time of the route confirmation request sent by the first node is earlier.

307, returning a successful route confirmation response to the first node.

This step indicates that the current node determines that the route of the connection requested to be established can be established, then the flow is ended.

It should be noted that the first node deletes the request time stored after the route of the connection requested to be established is established successfully, and it is known from the determining step according to request time that when the second node, the third node or the Nth node also sends a route confirmation request and the route of the connection requested to be established conflicts with that of the connection requested by the first node, by a comparison between request time and a corresponding processing, the probability of route conflict is reduced and the reliability of the establishment of the connection route is improved.

In case of rerouting initiated due to the failure of a node device or other reasons, the establishment process of a rerouting connection is identical to the above establishment process of the route of the connection.

Figure 4:
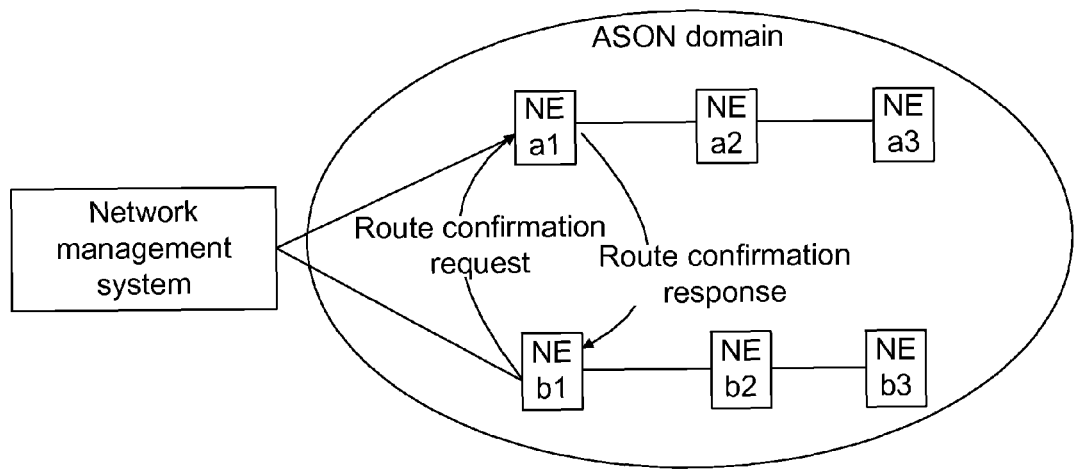
FIG. 4 is a schematic diagram of a method for establishing a route of a connection according to an embodiment of the present invention.

FIG. 4 shows an embodiment illustrating confirmation and establishment process of a route. Two service connections, NEa1-NEa2-NEa3 and NEb1-NEb2-NEb3 are shown in FIG. 4, wherein NEa1 and NEb1 are source nodes, and the two connections belong to the same route relation group. A management plan configures the information of the route relation group including the two connections and the route resource information of the two connections on the source nodes NEa1 and NEb1 of the two connections. When a new route of a connection is required to be established, the NEb1 sends a route confirmation request carrying route resource information to the source node NEa1 in the NEa1-NEa2-NEa3 belonging to the same route relation group; after confirming that the route can be established, the NEa1 returns a successful route confirmation response to the NEb1, and then the NEb1 establishes the route of the connection.

Additionally, according to the adjustment on service or other situations, it may be required to remove an established route relation group. When a route relation group is needed to remove, a route relation group removal or deletion command is distributed to the source nodes of all the connections in the route relation group, and the source nodes delete the stored route relation group or the names of the connections contained in the information of the route relation group after receiving the command. For example, if the information of the route relation group shown in table 1 is stored in the source nodes, the names of connections in 'relatedConnectionIdList' are deleted to empty the list, then the route relation group is removed.

It can be seen from the description above that by classifying the connections having the same route relation into a route relation group, storing the label of the route relation group in the route resource information of the connections in the route relation group, and configuring the route resource information of the connections and the information of the route relation group on the source nodes of the connections, the present invention is enables the source nodes to conduct route calculation to determine a route of the connection requested to be established and determine the route relation group which the connection belongs to according to the calculated route. By using the above configuration and management method of route relation, the present invention improves the real-time performance of the route resources on the source nodes, compared to the existing connection correlation route relation management method. The source nodes having capability of route calculation can participate in the process of the confirmation on the establishment of a route of the connection during a rerouting, which guarantees the real-time performance of route constraint, therefore the present invention realizes route relation management after the rerouting of a connection and reduces the possibility of route conflict during route calculation, compared to existing manual route relation constraint management method.

In embodiments of the present invention, during the establishment process of the route of the connection, the service nodes having capability of route calculation only calculate the route of the connection according to the route constraint condition set by the client or the network management system on the connection requested to be established currently but not calculate all routes, and generates an actual route (that is, establishing a route of the connection) only after all related service nodes (e.g. the second node, the third node, . . . , and the Nth node mentioned in the present invention) confirm that the route can be established. Therefore, on one hand, the overhead of the service nodes on route calculation is lowered as only the source nodes initiating a route confirmation request calculate the route, and on the other hand, the possibility of route conflict is greatly reduced due to the confirmation mechanism of the route establishment. Compared to the prior art, the embodiments of the present invention can effectively solve the problem of real-time performance existing in network route relation management and is especially applicable to the hybrid network of the conventional network and other networks.

Figure 5:
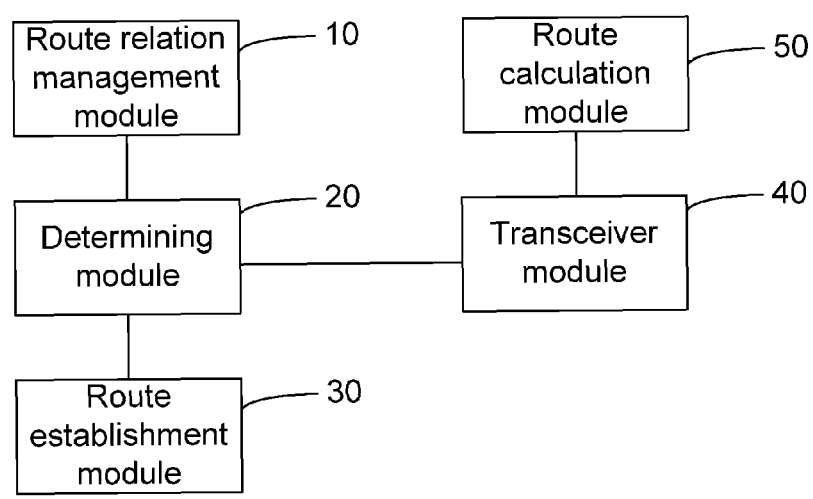
FIG. 5 is a structure schematic diagram of a device for establishing a route of a connection according to the present invention.

In order to realize the above method for establishing a route of a connection, the embodiment of the present invention further provides a service node device for establishing a route, which is applicable to the first node, the second node, the third node, . . . , and the Nth node of the present invention, the structure of the device is shown in FIG. 5 and the device comprises:

a route relation management module 10, which is used for configuring a route relation group on a service node responsible for route calculation, wherein the route relation group comprises a connection in which the service node is contained and other connections having route relation with the connection;

a determining module 20, which is used for confirming a route of a connection according to the route relation group configured on the service node responsible for route calculation when the route of the connection is requested to be established; and a route establishment module 30, which is used for establishing the route of the connection according to a result of the confirmation.

The device further comprises:

a transceiver module 40, which is used for receiving a route establishment request of a connection when a route of the connection is requested to be established, and sending, via a route confirmation request, route resource information of the connection to service nodes of other connections in a specific route relation group which are responsible for route calculation; and a route calculation module 50, which is used for receiving the route establishment request of the connection, calculating the route of the connection to obtain route resource information, and determining the specific route relation group which the connection requesting establishment of the route belongs to.

Correspondingly, the determining module 20 is further used for confirming whether the route of the connection can be established according to the route confirmation request of the connection and providing a result of the confirmation to the route establishment module 30.

In conclusion, by establishing a route relation group, the route relation management and the method and device for establishing a route of a connection described in the above embodiments of the present invention can manage both the route relation of the connections in the service having one source or destination and the route relation of the connections having different sources and destinations, and can also manage route relation between different services; furthermore, by confirming whether the route of the connection can be established via the service nodes of other connections having route relation, the route of the connection to be established can be verified, therefore, the present invention effectively solves the consistence problem existing in route relation management of connections in existing networks, improves the service survivability of networks, makes the management on network resource more flexible, and guarantees the effective protection and recovery capacity of the services in the network.

The mentioned above are only preferred embodiments of the present invention but not limitation to the protection scope of the present invention.

The invention claimed is:

1. A method for establishing a route of a connection, comprising:
configuring a route relation group on a service node responsible for route calculation, the route relation group comprising a connection in which the service node is contained and other connections having route relation with the connection; and
when a route of a connection is requested to be established, the service node responsible for route calculation confirming the route of the connection according to the route relation group configured on the service node, and then establishing the route of the connection,
wherein the step of configuring a route relation group on a service node responsible for route calculation specifically comprises:
classifying connections into a corresponding route relation group according to route relation between connections;
storing a label of the route relation group in route resource information of each connection in the route relation group; and
configuring information of the route relation group and route resource information of all the connections in the route relation group on the service nodes of each connection in the route relation group which are responsible for route calculation.

2. A method for establishing a route of a connection, comprising:
configuring a route relation group on a service node responsible for route calculation, the route relation group comprising a connection in which the service node is contained and other connections having route relation with the connection; and
when a route of a connection is requested to be established, the service node responsible for route calculation confirming the route of the connection according to the route relation group configured on the service node, and then establishing the route of the connection,
wherein the step of confirming the route of the connection specifically comprises:
after receiving a route establishment request of the connection, the service node responsible for route calculation calculates the route of the connection to obtain route resource information;
a specific route relation group which the connection belongs to is determined according to the route resource information and information of the route relation group configured on the service node;
via a route confirmation request, the calculated route resource information is sent to service nodes of other connections in the specific route relation group which are responsible for route calculation;
the service nodes of other connections responsible for route calculation respectively confirm whether the route of the connection can be established, and return a result of the confirmation to the service node receiving the route establishment request and responsible for route calculation; and
the service node receiving the route establishment request and responsible for route calculation determines whether to establish the route of the connection according to the result of the confirmation.

3. The method according to claim 2, wherein the step of confirming whether the route of the connection can be established specifically comprises:
a current service node determines whether the route of the connection meets route relation of the specific route relation group, if no, the current service node determines that the route of the connection cannot be established, if yes, the current service node determines whether the route of the connection conflicts with that of a connection which has been established on the current service node;
if the current service node determines that there exists a conflict, then it determines that the route of the connection cannot be established; if the current service node determines that no conflict exists, then it determines whether a route confirmation request has been sent, if no, it determines that the route of the connection can be established, if yes, it determines whether a route of a connection corresponding to the route confirmation request sent by the current service node conflicts with that of the connection corresponding to the route confirmation request sent by the service node receiving the route establishment request and responsible for route calculation;
if the current service node determines that no conflict exists, it determines that the route of the connection can be established; if the current service node determines that there exists a conflict, then it determines whether request time of the route confirmation request sent by the current service node is earlier than that of the route confirmation request sent by the service node receiving the route establishment request of the connection and responsible for route calculation, if so, it determines that the route of the connection cannot be established, otherwise, it determines that the route of the connection can be established.

4. The method according to claim 3, further comprising:
returning a successful route confirmation response to the service node receiving the route establishment request and responsible for route calculation if it is determined that the route of the connection can be established;
returning a failed route confirmation response to the service node receiving the route establishment request of the connection and responsible for route calculation if it is determined that the route of the connection cannot be established.

5. The method according to claim 4, wherein specifically, the step that the service node receiving the route establishment request and responsible for route calculation determines whether to establish the route of the connection according to the result of the confirmation comprises:
it is determined to establish the route of the connection if the results of the confirmation returned by the service nodes of the other connections responsible for route calculation are all successful route confirmation responses;

it is determined to give up the establishment of the route of the connection if there is a failed route confirmation request in the results of the confirmation returned by the service nodes of the other connections responsible for route calculation.

6. A device for establishing a route of a connection, comprising:

a route relation management module, used for configuring a route relation group on a service node responsible for route calculation, the route relation croup comprising a connection in which the service node is contained and other connections having route relation with the connection;

a determining module, used for confirming a route of a connection according to the route relation group configured on the service node responsible for route calculation when the route of the connection is requested to be established;

a route establishment module, used for establishing the route of the connection according to a result of the confirmation;

a transceiver module, used for receiving a route establishment request of a connection when a route of the connection is requested to be established, and sending, via a route confirmation request, route resource information of the connection to service nodes of other connections in a specific route relation group which are responsible for route calculation; and a route calculation module, used for calculating the route of the connection according to the route establishment request of the connection to obtain route resource information and determining the specific route relation group which the connection requesting the establishment of the route belongs to.

7. The device according to claim 6, wherein the determining module is further used for confirming whether the route of the connection can be established according to the route confirmation request of the connection and providing the result of the confirmation to the route establishment module.

* * * * *